(12) United States Patent
O'Connor et al.

(10) Patent No.: US 6,475,331 B1
(45) Date of Patent: Nov. 5, 2002

(54) CYANOACRYLATE COMPOSITIONS

(75) Inventors: John T. O'Connor, Wallingford, CT (US); Roger J. Grismala, Enfield, CT (US)

(73) Assignee: Henkel Loctite Corporation, Rocky Hill, CT (US)

(*) Notice: Subject to any disclaimer, the term of this patent is extended or adjusted under 35 U.S.C. 154(b) by 0 days.

(21) Appl. No.: 09/888,555

(22) Filed: Jun. 26, 2001

(51) Int. Cl.[7] .................................................. C09J 3/14
(52) U.S. Cl. ...................... 156/331.2; 526/209; 526/298
(58) Field of Search .................. 526/209, 298; 156/331.2

(56) References Cited

U.S. PATENT DOCUMENTS

| | | | |
|---|---|---|---|
| 4,170,585 A | 10/1979 | Motegi et al. | 260/33.2 |
| 4,556,700 A | 12/1985 | Harris et al. | 526/209 |
| 4,622,414 A | 11/1986 | McKervey | 560/61 |
| 4,636,539 A | 1/1987 | Harris et al. | 523/214 |
| 4,695,615 A * | 9/1987 | Leonard et al. | 526/194 |
| 4,718,966 A * | 1/1988 | Harris et al. | 156/331.2 |
| 4,837,260 A | 6/1989 | Sato et al. | 524/261 |
| 4,855,461 A | 8/1989 | Harris | 549/348 |
| 4,906,317 A | 3/1990 | Liu | 156/307.3 |
| 4,933,407 A * | 6/1990 | Harris et al. | 526/208 |
| 5,312,864 A | 5/1994 | Wenz et al. | 524/716 |
| 5,589,554 A * | 12/1996 | Hiraoka | 525/530 |
| 5,902,443 A * | 5/1999 | Kanakubo et al. | 156/305 |

OTHER PUBLICATIONS

H.V. Coover, D.W. Dreifus and J.T. O'Connor, "Cyanoacrylate Adhesives" in *Handbook of Adhesives*, 27, 463–77, I. Skeist, ed., Von Nostrand Reinhold, New York, 3rd ed. (1990).

G.H. Millet "Cyanoacrylate Adhesives" in *Structural Adhesives: Chemistry and Technology*, S.R. Hartshorn, ed., Plenun Press, New York, p. 249–307 (1986).

* cited by examiner

Primary Examiner—Judy M. Reddick
(74) Attorney, Agent, or Firm—Steven C. Bauman

(57) ABSTRACT

This invention relates to cyanoacrylate-containing compositions that include, in addition to the cyanoacrylate component, the combination of two accelerators to improve fixture speeds on certain substrates.

20 Claims, No Drawings

CYANOACRYLATE COMPOSITIONS

BACKGROUND OF THE INVENTION

1. Field of the Invention

This invention relates to cyanoacrylate-containing compositions that include, in addition to the cyanoacrylate component, the combination of two accelerators to improve fixture speeds on certain substrates.

2. Brief Description of Related Technology

Cyanoacrylate adhesive compositions are well-known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463–77, I. Skeist, ed., Van Nostrand Reinhold, New York, 3rd ed. (1990). See also, G. H. Millet "Cyanoacrylate Adhesives" in *Structural Adhesives: Chemistry and Technology*, S. R. Hartshorn, ed., Plenun Press, New York, p. 249–307 (1986).

Nonetheless, various techniques have been used to improve further the fixture times of such adhesive compositions for certain applications where it is important to be able to secure one substrate to another quickly, while allowing the bond strength to develop over time. In addition, substrates constructed of certain materials have proven in the past difficult to bond, irrespective of the application to which the adhesive and the substrate are to be placed.

To combat these issues, Loctite Corporation developed a technology based on calixarene and oxacalixarene compounds. Generally, the addition of such materials to a cyanoacrylate allow for accelerated fixturing of substrates to-be-bonded together. See U.S. Pat. Nos. 4,556,700, 4,622,414, 4,636,539, 4,695,615, 4,718,966, and 4,855,461.

In addition to calixarene compounds, Loctite Corporation also developed technology based on the addition of silacrown compounds to cyanoacrylate adhesive compositions to accelerate fixturing. For instance, U.S. Pat. No. 4,906,317 (Liu) is directed to cyanoacrylate adhesive compositions which include silacrown compounds as additives to give substantially reduced fixture and cure times on de-activating substrates such as wood. The silacrown compounds are preferably employed at levels of about 0.1–5% by weight of the composition.

More recently, Henkel KgAA developed technology based on the addition to cyanoacrylate compositions of cyclodextrins to accelerate fixturing. In U.S. Pat. No. 5,312,864 (Wenz), the acceleration of the setting properties of a cyanoacrylate adhesive composition by adding thereto a hydroxyl group derivative of an α-, β- or γ-cyclodextrin which is at least partly soluble in the cyanoacrylate is described.

Other approaches have also been investigated, such as in U.S. Pat. Nos. 4,170,585 (Motegi), in which it is reported the use of crown ethers in cyanoacrylate adhesive compositions, and in 4,837,260 (Sato), in which thixotropic silica has been included in such components.

Notwithstanding the state-of-the-technology it would be desirable to provide alternative technologies to improve the fixturing speed of cyanoacrylates.

SUMMARY OF THE INVENTION

The present invention is directed to a cyanoacrylate-based composition, which includes beyond the cyanoacrylate component, two accelerator components, the combination of which demonstrates improved fixture speeds, particularly on. substrates constructed of certain materials, namely steel and epoxy glass, and demonstrated comparable fixture speeds on certainlother substrates, namely leather and the woods, balsawood and maple.

The two accelerator components are (a) calixarenes and oxacalixarenes, and (b) crown ethers.

The inventive composition may be rendered thixotropic by the addition of thixotropy-conferring agent. The viscosity. of the inventive composition may also be increased by the addition of a thickener.

This invention is also directed to a method of bonding together two substrates, at least one of which is constructed of certain materials, namely steel and epoxy glass, leather and the woods, balsawood and maple. The method includes applying to at least one of the substrates a composition as described above, and thereafter mating together the substrates.

In addition, the present invention is directed to reaction products of the inventive compositions.

Also, the invention is directed to a method of preparing the inventive compositions.

The invention will be more fully understood by a reading of the section entitled "Detailed Description of the Invention", which follows.

DETAILED DESCRIPTION OF THE INVENTION

As noted above, this invention is directed to a cyanoacrylate-based composition, which includes beyond the cyanoacrylate component, the two accelerator components, the combination of which demonstrates improved fixture speeds, particularly on substrates constructed of certain materials, namely steel and epoxy glass, and demonstrated comparable fixture speeds on certain other substrates, namely leather and the woods, balsawood and maple.

The cyanoacrylate component includes cyanoacrylate monomers which may be chosen with a raft of substituehts, such as those represented by $H_2C=C(CN)—COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2- cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2- cyanoacrylate.

The cyanoacrylate component should be included in the compositions in an amount within the range of from about 50% to about 99.98% by weight, with the range of about 90% to about 99% by weight being desirable, and about 95% by weight of the total composition being particularly desirable.

The first accelerator may be selected from calixarenes, oxacalixarenes, and combinations thereof.

Of the calixarenes and oxacalixarenes, many are known, and are reported in the patent literature. See e.g., U.S. Pat. Nos. 4,556,700, 4,622,414, 4,636,539, 4,695,615, 4,718, 966, and 4,855,461, the disclosures of each of which are hereby expressly incorporated herein by reference.

For instance, as regards calixarenes, those: within structure I are useful herein:

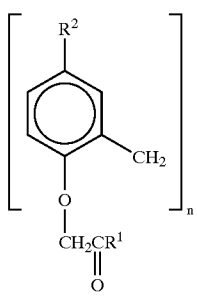

$$\left[\begin{array}{c} R^2 \\ \phantom{x} \\ \phantom{x} \\ \phantom{x} \\ CH_2 \\ O \\ | \\ CH_2CR^1 \\ \| \\ O \end{array}\right]_n \quad I$$

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

The second accelerator is a crown ether.

A host of crown ethers are known. For instance, examples which may be used herein either individually or in combination, or in combination with other first accelerators include 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1, 4-benzo-5-oxygen-20-crown-7. See U.S. Pat. No. 4,837,260 (Sato), the disclosure of which is hereby expressly incorporated here by reference.

The first accelerator component, calixarene and/or oxacalixarene, should be included in the compositions in an amount within the range of from about 0.1% to about 5% by weight, with the range of about 0.1 to about 0.5% by weight being desirable, and about 0.2% by weight of the total composition being particularly desirable.

The second accelerator component, crown ethers, should be included in the compositions in an amount within the range of from about 0.01% to about 10% by weight, such as about 0.1% to about 5% by weight, with the range of about 0.1 to about 0.5% by weight being desirable, and about 0.4% by weight of the total composition being particularly desirable.

The inventive compositions may also be rendered thixotropic by the addition of thixotropy-conferring agents, such as fumed silicas. See U.S. Pat. Nos. 4,477,687 (Litke), 4,533,422 (Litke) and Re. 32,889 (Litke) and 4,837,260 (Sato). Thixotropy-conferring agents should be included in the inventive compositions in an amount less than about 12%, such as within the range of about 4 to about 8%, by weight of the total composition.

The inventive compositions may also be thickened by the addition of thickeners, such as polymethyl(meth)acrylate, in order to increase viscosity. Thickeners should be included in the inventive composition in an amount less than about 12%, such as within the range of about 4 to about 8%, such as about 6%, by weight of the total composition.

Additives may be included in the inventive compositions to confer additional physical properties, such as improved shelf-life stability, color, improved toughness, and enhanced resistance to thermal degradation. Such additives therefore may be selected from free radical stabilizers, anionic stabilizers, dyes, toughening agents, thermal degradation enhancers, and combinations thereof.

In another aspect of the invention, there is provided a method of bonding together two substrates, at least :one of which is constructed of certain materials, namely steel and epoxy glass, leather and the woods, balsawood and maple. The method includes applying to at least one of the substrates a composition as described above, and thereafter mating together the substrates for a time sufficient to permit the adhesive to fixture. For many applications, the substrate should become fixed in less than 30 seconds, and depending on substrate as little as 1–5 seconds.

In yet another aspect of the invention, there is provided reaction products of the so-described compositions.

In still another aspect of the invention, there is provided a method of preparing the so-described compositions. The method includes providing a cyanoacrylate component, and combining therewith with mixing a first and second accelerator component.

In an additional aspect of the invention, there is provided a method of bonding together two substrates, at least one of which is constructed of a material selected from the group consisting of certain materials, namely steel and epoxy glass, leather and the woods, balsawood and maple, using the compositions of this invention. The method includes applying a the compositions to at least one of the substrates and mating together the substrates for a time sufficient to permit the composition to fixture.

These aspects of the invention will be further illustrated by the examples which follow.

EXAMPLES

We prepared four samples to evaluate their fixture speeds on a variety of substrates. The samples were prepared by mixing together the constituents in any order for a sufficient period of time to ensure substantial homogeneity of the constituents. If desired, certain materials may be added to inhibit cyanoacrylate polymerization thereby conferring stability to the formulation (such as conventional acidic materials), or removal (through conventional filtration and/or separation technology) of materials which if present would cause cyanoacrylate polymerization. Removal of such materials should improve the shelf life of the formulation (e.g., catalysts used to prepare that constituent, or starting materials or by products from the preparation thereof). The constituents of these samples are listed below in Table 1.

TABLE 1

| | Sample No./Weight % | | | | |
|---|---|---|---|---|---|
| Component | 1 | ② | 3 | ④ | 5 |
| Ethyl-2-cyanoacrylate | 88 | 87.2 | 83.8 | 87.6 | 93.8 |
| Tetrabutyl tetra (2-ethoxy-2-oxoethoxy) calix(4)arene | — | 0.8 | — | 0.2 | 0.2 |
| 15-Crown-5 | — | — | 0.2 | 0.2 | — |
| Methane sulfonic acid | 10 ppm | 15 ppm | 10 ppm | 10 ppm | 10 ppm |
| Sulfur dioxide | 10 ppm | 15 ppm | 10 ppm | 10 ppm | 10 ppm |
| Polymethylmethacrylate | 6.0 | 6.0 | 6.0 | 6.0 | 6.0 |
| Silica | 6.0 | 6.0 | — | 6.0 | — |

We applied each of Sample Nos. 1–5 to the substrates listed below in Table 2, and measured their fixture speeds. More specifically, we applied each sample to one substrate, and then placed the other substrate over the sample-applied substrate. The substrates were mated and held motionless with the application of finger pressure. The substrates were then pulled in a tensile shear mode to determine the time required for the substrates to support their own weight and resist firmly being pulled apart. That time was recorded as the fixture time, and the results are shown below in Table 2.

TABLE 2

| Property | Substrate | Sample No. | | | | |
|---|---|---|---|---|---|---|
| | | 1 | 2 | 3 | 4 | 5 |
| Fixture | Paper | 55 | 8 | 2 | 3 | 3 |
| Times | Steel | 240 | 225 | 30 | 10 | 25 |
| (secs) | Epoxy Glass | 160 | 35 | 25 | 20 | 95 |
| | Leather | >300 | 20 | 10 | 5 | 5 |
| | Balsawood | 45 | 110 | — | 1 | 2 |
| | Maple | 220 | 250 | 40 | 40 | 120 |
| | Birch | >300 | 245 | 30 | 35 | 60 |
| | Oak | >300 | >300 | 90 | 110 | 150 |
| | Pine | 295 | >300 | 35 | 55 | 100 |
| | Walnut | >300 | >300 | 90 | 90 | 110 |

As can be seen, Sample No. 4 (cyanoacrylate, in combination with a calixarene and a crown ether) demonstrates improved fixture speeds on certain substrates, namely steel and epoxy glass, and demonstrated comparable fixture speeds on certain other substrates, namely leather and the woods, balsawood and maple.

What is claimed is:

1. A cyanoacrylate adhesive composition comprising:
   (a) a cyanoacrylate component; and
   (b) an accelerator component consisting essentially of (i) calixarenes, oxacalixarenes, or a combination thereof, and (ii) at least one crown ether, wherein said composition exhibits a fixturing speed of less than 20 seconds for bonding two substrates, at least one of which is constructed of a material selected from the group consisting of steel, epoxy glass, and balsawood.

2. The composition according to claim 1, wherein the cyanoacrylate component is represented by the structure $H_2C=C(CN)—COOR$, wherein R is selected from the group consisting of $C_{1-15}$ alkyl, alkoxyalkyl, cycloalkyl, alkenyl, aralkyl, aryl, allyl and haloalkyl groups.

3. The composition according to claim 1, wherein the cyanoacrylate component comprises ethyl-2-cyanoacrylate.

4. The composition according to claim 1, wherein the calixarene is represented by the following formula

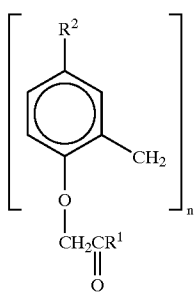

I where $R^1$ is alkyl or alkoxy; $R^2$ is H or alkyl; and n is 4, 6 or 8.

5. The composition according to claim 1, wherein the calixarene is tetrabutyl tetra calix-4-arene.

6. The composition according to claim 1, wherein the accelerator component is an oxacalixarene.

7. The composition according to claim 1, wherein the crown ether is a member selected from the group consisting of 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methyl-benzo-18-crown-6, 1,2-methylbenzo-5,6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6, and 1,2-benzo-1,4-benzo-5-oxygen-20-crown-7 and combinations thereof.

8. The composition according to claim 1, wherein the accelerator component is used in an amount within the range of from about 0.01% by weight to about 5% by weight based on the total composition.

9. The composition according to claim 1, wherein the crown ether is used in an amount within the range of from about 0.01% by weight to about 5% by weight based on the total composition.

10. The composition according to claim 1, further comprising a thixotropic agent.

11. The composition according to claim 1, further comprising a thickener.

12. The composition according to claim 1, further comprising an additive selected from the group consisting of free radical stabilizers, anionic stabilizers, dyes, toughening agents, thermal degradation enhancers, and combinations thereof.

13. A cyanoacrylate adhesive composition comprising:
   (a) a cyanoacrylate component;
   (b) an accelerator component consisting essentially of (i) calixarenes, oxacalixarenes, or a combination thereof; and (ii) at least one crown ether; and
   (c) a thixotropic agent, therein said composition exhibits a fixturing speed of less than 20 seconds for bonding two substrates, at least one of which is constructed of a material selected from the group consisting of steel, epoxy glass, and balsawood.

14. The composition according to claim 1, further comprising:
   (d) a thixotropic agent; and
   (e) a thickener component.

15. Cured products of the composition according to claim 1.

16. A method of bonding together two substrates, at least one of which is constructed of a material selected from the group consisting of steel, epoxy glass and wood, comprising the steps of:
   applying a cyanoacrylate-containing composition according to claim 1, to at least one of the substrates and
   joining together the substrates for a time sufficient to permit the adhesive to fixture.

17. A method of preparing a cyanoacrylate-containing composition according to claim 1, comprising the steps of:
   providing a cyanoacrylate component, and combining therewith with mixing said accelerator component and a crown ether.

18. A cyanoacrylate adhesive consisting essentially of:
   (a) a cyanoacrylate component;
   (b) an accelerator component consisting essentially of (i) calixarenes, oxacalixarenes, or a combination thereof;

and (ii) at least one crown ether, wherein said composition exhibits a fixturing speed of less than 20 seconds for bonding two substrates, at least one of which is constructed of a material selected from the group consisting of steel, epoxy glass, and balsawood.

19. The composition according to claim 18, further comprising a thixotropic agent.

20. The composition according to claim 19, further comprising a thickener component.

* * * * *